United States Patent [19]

Callender

[11] Patent Number: 5,442,845

[45] Date of Patent: Aug. 22, 1995

[54] INJECTION BLOW MOLD CORE ROD ASSEMBLY ADJUSTING TOOL AND METHOD

[76] Inventor: Robert B. Callender, 2228 Monaghan Ct., Spring Valley, Calif. 91977

[21] Appl. No.: 134,267

[22] Filed: Oct. 8, 1993

[51] Int. Cl.[6] .................... B23Q 17/22; B29C 49/78
[52] U.S. Cl. ................... 29/407; 29/890.121; 81/437
[58] Field of Search .................. 29/407, 720, 890.12, 29/890.121, 890.123, 890.124, 705, 709, 721; 81/94, 437; 264/541; 425/190, 451, 451.4, 454, 432, 434, 435

[56] References Cited

U.S. PATENT DOCUMENTS

| 2,350,097 | 5/1944 | Conner | 81/437 X |
|---|---|---|---|
| 3,883,286 | 5/1975 | Kinnlow, Jr. et al. | 425/451 X |
| 4,394,116 | 7/1983 | Kuenzig et al. | 264/541 X |
| 4,569,651 | 2/1986 | Krall | 425/532 |
| 5,127,289 | 7/1992 | Lanhan | 81/437 X |
| 5,168,890 | 12/1992 | Bongart et al. | 29/890.124 X |
| 5,289,634 | 3/1994 | Makino et al. | 29/407 X |

FOREIGN PATENT DOCUMENTS

| 558026 | 12/1943 | United Kingdom | 81/437 |
| 1727985 | 4/1992 | U.S.S.R. | 81/437 |

*Primary Examiner*—Peter Dungba Vo
*Attorney, Agent, or Firm*—Milton E. Gilbert

[57] ABSTRACT

A unitary tool and method for adjusting and measuring the valve stroke in an injection blow mold core rod assembly which utilizes a lock/star nut and cam/hex nut arrangement to limit valve stroke. The tool is mountable on the end of the core rod and includes a pair of centerless hollow wrenches which can independently engage and rotate the star nut and cam nut, respectively. The tool also includes a push rod located within the wrenches which can be placed in contact with the hex nut so as to transmit the position of the hex nut and hence any movement of the core rod valve assembly on which the hex nut is fastened. A dial indicator is carried by the tool and arranged so as to have its sensor rod in position to be contacted by the push rod.

21 Claims, 5 Drawing Sheets

INJECTION BLOW MOLD CORE ROD ASSEMBLY ADJUSTING TOOL AND METHOD

FIELD OF THE INVENTION

The present invention relates to injection blow molding apparatus and processes, and is more particularly concerned with injection blow mold core rod assemblies and their adjustment.

BACKGROUND OF THE INVENTION

Injection blow molding is a two-stage process customarily used in the manufacture of plastic products having a hollow configuration. In the first stage of the process, plastic is injection molded, usually over a steel core rod or pin, into a preform cavity where a partially shaped mass of plastic is pre-formed into what is customarily called a parison, and this parison is temperature conditioned. In the second stage the parison is transferred while on the core rod into a blow mold, where air is introduced through the core rod and the parison is blown outwardly against the confines of the blow mold to its final shape, and cooled. The blown plastic product is then stripped off of the core rod and ejected from the machine.

In a typical injection blow molding machine a rotary turret is provided that has three or more surfaces. Each surface supports one or more core rod assemblies at each molding station. When the turret is rotated, the array of core rod assemblies are transferred successively between molds, i.e. moved sequentially from station to station. The first station is the parison station, which has an array of parison or preform molds, at which the parisons are injection molded on the core rod assemblies. Then the core rod assemblies carrying the parisons are rotated to another station having an array of blow molds, where the parisons are blown to form hollow articles, such as containers. Finally, the turret is rotated to bring the hollow articles to a point where they are removed from the core rods, thus permitting a new cycle to begin.

These core rod assemblies include a hollow core rod which provides a passageway for introducing the blowing medium, usually compressed air, into the parison to be inflated once inside the blow mold. The core rod's air passage is normally opened and closed by means of a spring-loaded core rod valve which admits air during the blow molding step. Opening of the valve is actuated by a push bar located within the rotating turret or transfer head. The push bar is activated either by a direct mechanical means or by pneumatic pistons acting on the push bar. The movement of the push bar is typically fixed and not adjustable, and always terminates against the end of the core rod which faces the push bar. The push bar applies force against the end of the core rod valve assembly when it contacts it in order to overcome the resistance of the spring to open the valve.

The valve opening or "stroke" determines the air flow into the unblown parison as well as determining the ease of venting of the compressed air from the blown hollow article prior to removing it from the blow mold. Since differing valve strokes will result in different amounts of parison movement in the blow mold and air flow into and out of the blown article, valve stroke is extremely critical to repeatability of the blow molding process from cavity to cavity and from cycle to cycle.

Consequently, these core rod valves must all be adjusted so as to stay open for a time sufficient to allow for a predetermined amount of air to be emitted which is necessary to produce the desired molded article. The core rod valve assembly comprises a valve stem located within the core rod and a valve element carried by the valve stem. The valve is urged into seating engagement with a valve seat by means of a core rod spring, whose sole function is to close the valve. The compressive force applied by the spring causes it to act to close the valve. The valve spring is held in place by a locking or "star" nut and a crowned hex or "cam" nut, both of which are threaded onto the valve stem and are located inside the core rod. The cam nut extends beyond the core rod housing. Actuation of the valve is caused by the pressure of the push bar on the cam nut. The amount of cam nut extension beyond the core rod housing determines the amount of valve stroke.

Adjustment of the stroke of the core rod valves has heretofore been accomplished by a multi-stepped process, employing a plurality of tools, jigs or fixtures. Typically, a hand tool may be employed, which basically comprises a pair of wrenches which are used to adjust the valve spring compression. Typically, one of the wrenches operates on the lock or star nut and the other operates on the hex or cam adjustment nut. Sequentially, the star nut is manipulated first to release its lock on the cam adjustment nut, and then the hex nut is adjusted to set the distance of the valve stroke by adjusting the amount of cam nut extension beyond the core rod housing. The tool is removed and the cam nut extension or valve stroke measurement is accomplished by means of a dial indicator, a "go-no go" mechanical positioning device, an electrical means employing limit switches and lights, or other measurement devices. The simplest approach is to employ a dial indicator to measure the adjusted position of the cam nut, or its setting relative to the core rod housing. Following this, the wrench is again employed to either readjust the cam nut, or if it has been adjusted to its desired position to achieve the desired stroke, then the wrench is used to manipulate the star nut to lock the cam nut in the adjusted position. Should the desired position of the hex nut not be attainable by the first effort, then the foregoing process is repeated until the desired adjusted position is attained. Each time a setting is made the wrench is moved into position and removed, followed by positioning of a dial indicator, or other measuring device, against the core rod assembly to take a reading so as to measure the adjustment, and thereafter re-applying and again manipulating the wrench, etc.

It is therefore desirable to provide a unitary tool for setting or adjusting, and simultaneously measuring the adjustment of, core rod valve lock nuts, cam nuts and stroke.

It is a further object of the invention to provide a unitary tool for core rods to adjust the stroke of the core rod valve so as to achieve a desired valve stroke, without having to repeatedly use and withdraw wrenches from the core rod assembly.

A still further object of the invention is to provide a tool for adjusting the valve stroke of core rods used in injection blow molding machines, which employs a pair of hollow wrenches which rotate to provide the adjustment and do not require translation of the wrenches.

Still another object of the invention is to provide a tool for adjusting the valve stroke of core rods used in injection blow molding machines which permits direct measurement of the valve stroke as the tool is in the process of making adjustment of the hex and star nuts of the core rod assembly.

SUMMARY OF THE INVENTION

These and other objects of the present invention are achieved by providing a novel tool for adjusting and measuring the valve stroke of injection blow mold core rod assemblies which is mounted on that end of the core rod which is inserted into the transfer head of an injection blow molding machine. The tool comprises a housing having a pair of centerless hollow wrenches mounted so as to be able to rotate but not translate with respect to the housing. An inner wrench is configured so as to engage and rotate the hex nut and an outer wrench is configured so as to engage and rotate the star nut of a core rod assembly. The tool also includes a push rod which is arranged to freely translate within the tool housing and within the two hollow wrenches. The inner end of the push rod normally rests against the hex nut.

The push rod is translated between two stop positions. In one position the inner end of the push rod is aligned substantially flush with the end of the core rod housing while the outer end of the push rod is aligned substantially flush with the outer surface of the tool. In the other stop position the outer end of the push rod will protrude outside of the tool a distance that allows for the maximum valve stroke which the core rod assembly is contemplated to require. Since the push rod passes through the hollow wrenches and is placed in contact with the end of the hex nut, which is normally extended beyond the core rod housing, the position of the hex nut relative to the core rod housing itself can be measured. The distance that the push rod protrudes from the end of the tool housing is therefor an exact representation of the valve stroke. A dial indicator or other measuring device is mounted on the tool housing with its sensing probe in contact with the push rod outer end.

BRIEF DESCRIPTION OF THE DRAWINGS

These and other objects and features of the present invention are more fully disclosed or rendered obvious by the following detailed description of a preferred embodiment, which is to be considered together with the accompanying drawings, wherein like numbers refer to like parts., and further wherein:

FIG. 8 is a cross-sectional view taken along line 8—8 of FIG. 2, and

FIG. 9 is a cross-sectional view taken along line 9—9 of FIG. 2.

DETAILED DESCRIPTION OF THE INVENTION

As indicated previously, in a three station turret injection blow molding machine, the first station is where core rod assemblies are enclosed by injection molds and a parison is formed around the core rod of the shape dictated by the mold configuration. The core rod assemblies carrying the thus formed parisons are then transferred to the blow station.

Figure 1:
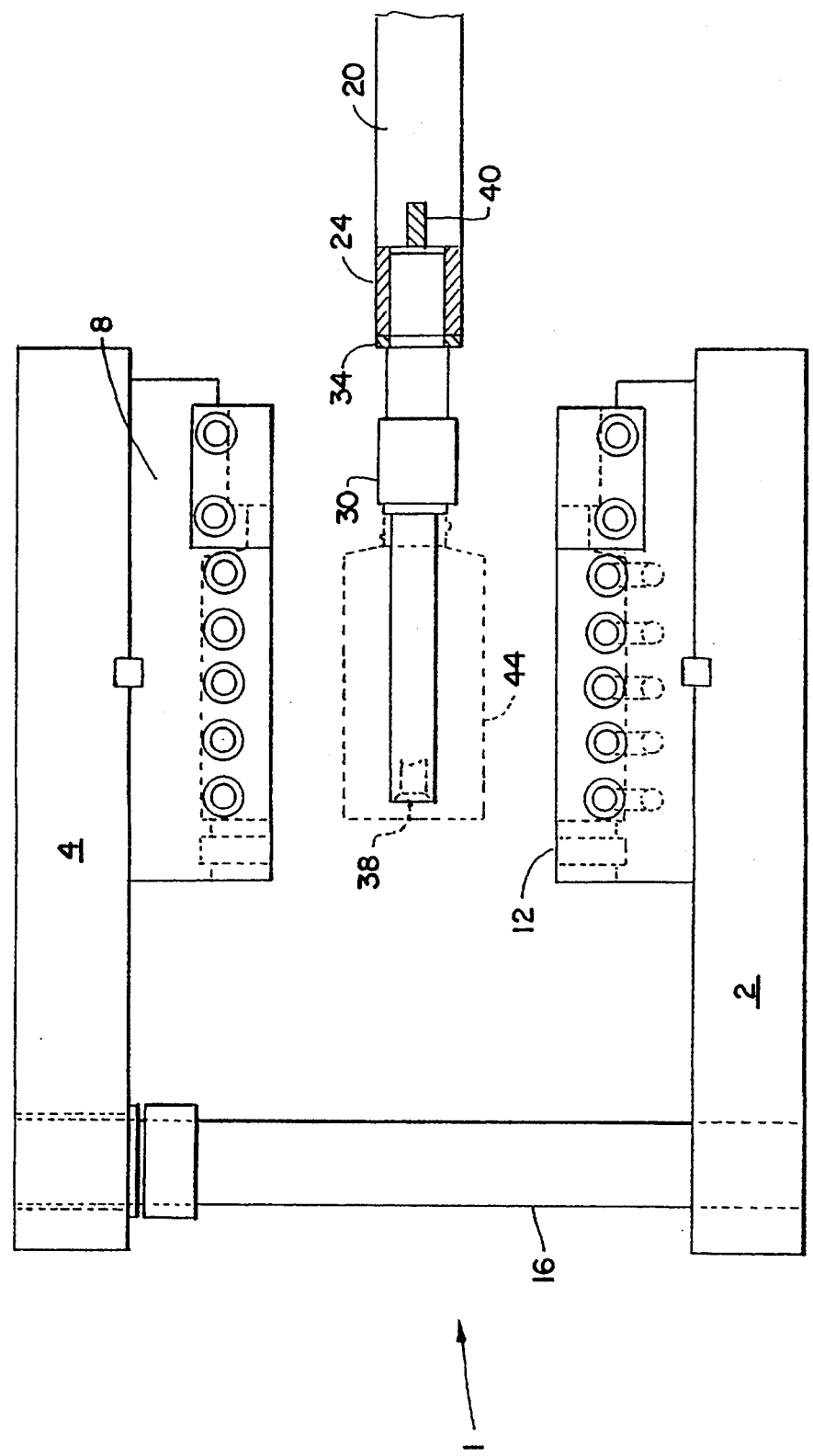
FIG. 1 is a side view illustrating a blow mold assembly at the blow station of a multi-station injection blow molding machine, and showing a typical core rod assembly.

With reference to FIG. 1, there is shown a portion of a typical blow mold at the blow station of a multi-station injection blow molding machine. Specifically, a blow mold 1 comprises a die set having a stationary half 2 and a movable half 4. The movable half carries the upper part 8, and the stationary half carries the lower part 12, of the blow mold. The movable half 4 of the die set is raised and lowered on guide pins such as pin 16. A transfer head 20, shown only schematically, is provided with a core rod holder 24 for receiving one end of the core rod 30. A retainer element 34 locks the core rod in the retained position.

As indicated in FIG. 1, at the blow station the previously formed parison is blown into the desired finished article by means of a stream of compressed air, which is admitted into the inside of the parison through core rod valve 38. The valve 38 is actuated into open position by a push bar 40 mounted in the transfer head thereby admitting a stream of compressed air through core rod valve 38 into the parison. As shown in FIG. 1 the finished article may be in the form of a container 44. For the sake of simplicity, and because the machine is well known to those skilled in the art, the source of compressed air, the means whereby such air is delivered to the core rod 30 and the means for actuating the push bar 40 are not shown.

Figure 2:
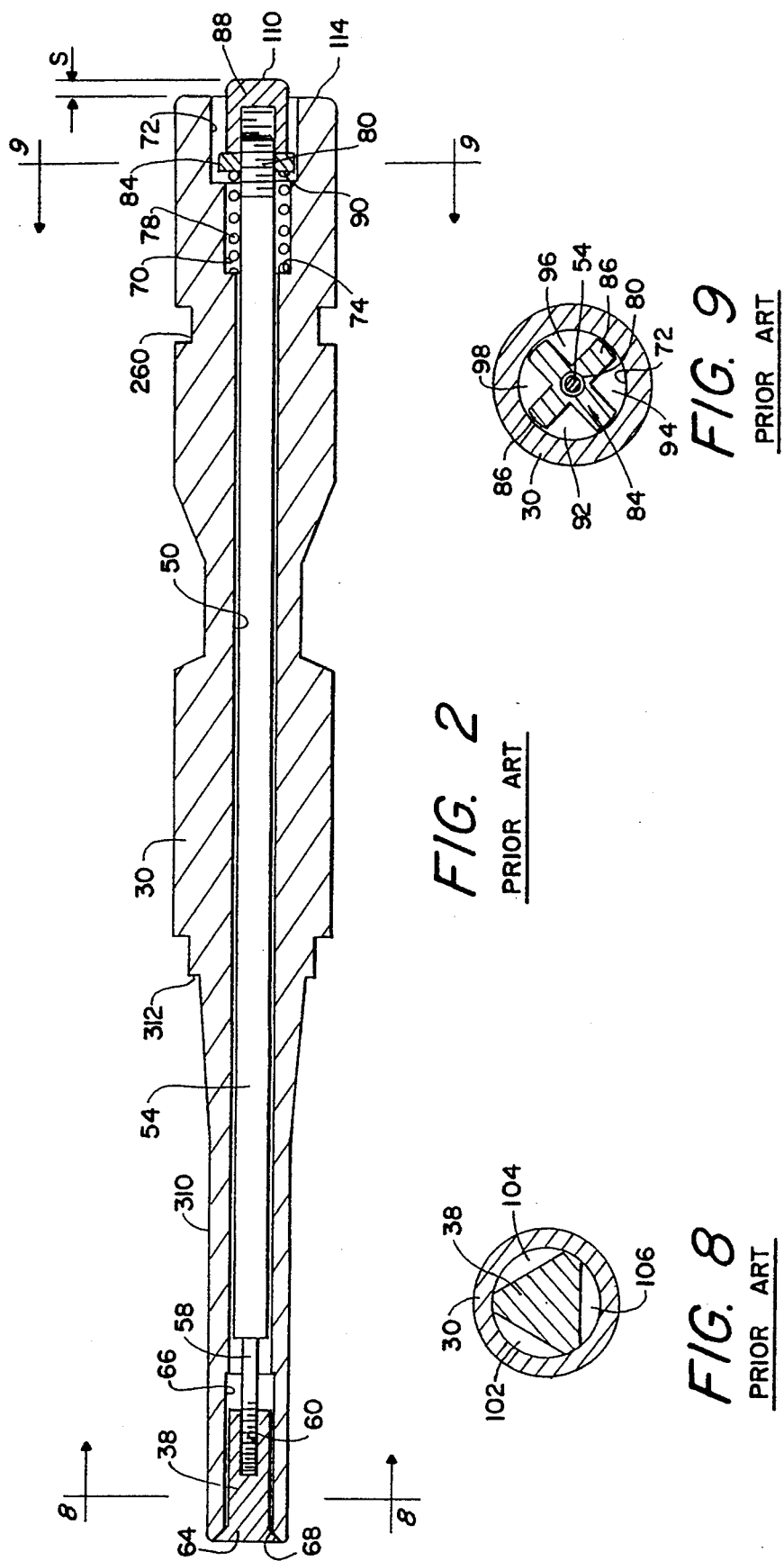
FIG. 2 is a longitudinal cross-sectional view through a conventional core rod assembly for use in an injection blow mold machine.

The construction of a typical core rod assembly is shown more clearly in FIG. 2. The core rod 30 is a hollow member having a through bore 50. A valve stem 54 is located in bore 50, and extends substantially through the entire length of this bore, terminating just short of either end of the rod. The forward end of the valve stem 54 is formed with a reduced diameter section 58 which is threaded as shown. The rear end of the core rod valve 38 is internally threaded at 60 so that it can be assembled to the reduced diameter threaded section 58 of the valve stem 54. The forward end of the core rod valve 38 is formed in the shape of a conical cap 64 which provides the valve element. The forward end of the core rod 30 is formed with a counterbore 66 in communication with bore 50 and in which the valve 38 can slide. The bore 66 terminates in a conical surface 68, against which the valve element 64 is normally seated.

The rear end of the core rod is provided with an intermediate counterbore 70 and an outer counterbore 72 both being of larger diameter than the bore 50. The intermediate counterbore 70 terminates at the surface 74 within the core rod 30. The space provided by the walls of the counterbore 70 serves as a chamber to house the valve spring 78, which rests at one end against the surface 74.

The rear end of the valve stem 54 is threaded at 80 in order to receive two positioning and locking elements which determine the valve opening or stroke. The first such element is a locking nut 84 which, as shown in FIG. 9, has a plurality of arms 86 which form a "star configuration", and has an outer diameter which is somewhat less than the diameter of the counterbore 72. The center portion of the nut 84 is provided with a threaded hole so that it can be assembled to the threaded portion 80 of the valve stem 54. The second locking element is a cam or hex nut 88 which is internally threaded and mounted on the threaded portion 80 of the valve stem 54 outwardly of the star nut. The other end of the valve spring 78 rests against the star nut. It is thus seen from FIG. 2 that when the star nut is rotated clockwise so as to move to the left it will compress the valve spring 78. When the star nut is moved in this fashion it will also release its locking action on the hex nut 88 so that it too can be rotated on the threaded portion 80.

In order to adjust the valve stroke, the star nut 84 is rotated clockwise as just described to release locking pressure on the hex nut 88, and then the hex nut is rotated so that it is moved to the left or to the right as viewed in FIG. 2. Following this the star nut 84 is rotated counter-clockwise until it engages the re-positioned hex nut 88 to serve as a "lock" to prevent rotation of the hex nut without releasing this lock. The locking action is further enhanced by the force of the spring 78 which applies its spring force against the surface 90 of the nut 84.

As discussed in connection with FIG. 1 the transfer head 20 of the injection blow molding machine is provided with a push bar 40 which bears against the outer end of the hex nut 88. At the time when it is desired to admit compressed air into the mold, the push bar 40 is actuated by mechanism (not shown) in the machine to push the hex nut to the left as viewed in FIG. 2. This action is resisted by the valve spring force since the spring 78 is further compressed by this action. In a properly functioning machine, the movement of the push bar 40 shown in FIG. 1 will cause it to first contact the cam nut 88 at surface 110 (see FIG. 2). Further movement of the push bar 40 overcomes the resistance of the valve spring and the valve assembly, thus lifting the valve element 64 off its seat 68 so that compressed air can be admitted inside the parison, inflating it to the limits of the blow mold cavity. The push bar movement terminates against the core rod housing 30 at surface 114. The core rod assembly and the machine are so designed that the surface 110 of cam nut 88 and the surface 114 of the core rod housing 30 lie in the same plane at the final "stop" position of the push bar 40.

As indicated previously, the mechanism whereby compressed air is delivered to the rear of the core rod assembly is not shown in detail since it is well known in the art. However, an air passage through the core rod assembly is shown, which is provided to permit such compressed air to exit through the valve opening created when the valve element 64 is lifted off of its seat 68. The first part of this air passage is provided by that portion of the counterbore 72 which is defined by the space between the outer surface of the hex nut 88 and the wall in the core rod 30 formed by the counterbore 72. The air passage is continued past the nut 84 because of its star configuration, as best seen in Fig.9. The spaces or interstices 92, 94, 96 and 98 between the arms 86 of the "star" allow air to pass "through" the nut into any remaining space in the counterbore 72, and then into the intermediate counterbore 70. Since the diameter of the valve stem 54 is less than the diameter of the through bore 50, a passageway is formed between the outer surface of the valve stem and the wall formed by the bore 50 to permit air to traverse the extent of the core rod from the intermediate counterbore 70 to the space formed between the outer surface of the reduced section 58 of the valve stem 54 and the wall formed by the bore 50.

As shown in FIG. 8 the core rod valve 38 has a generally triangular cross-sectional shape which extends through the major portion of its length, terminating only in the conical cap 64. This triangular shape provides passages 102, 104 and 106 which allows the compressed air to pass from the space formed between the outer surface of the reduced section 58 and the wall formed by the bore 50 around the body of valve 38 to the valve element 64. Air will be emitted into the inside of the parison from the passageway just described only when the valve element 64 is lifted off of its valve seat 68. The distance that the valve element lifts off of the valve seat determines the flow of air that is emitted from the core rod into the mold. That distance is in turn determined by the distance that the hex nut 88 is moved by the push bar 40. This distance is represented by the distance "s" shown in FIG. 2, which is the distance between the outermost portion 110 of the hex nut 88 and the rear end surface 114 of the core rod 30. This distance "s" is commonly referred to as the stroke of the valve.

The push bar 40, when actuated by the transfer head mechanism, will be moved from its position in contact with the portion 110 on the hex nut 88 to a position where it is flush with the end surface 114.

The stroke of the core rod valve is therefore determined by the position of the cam nut 88 relative to core rod surface 114 brought about by the manipulation of the star nut 84 and hex nut 88 as above described.

Figure 3:
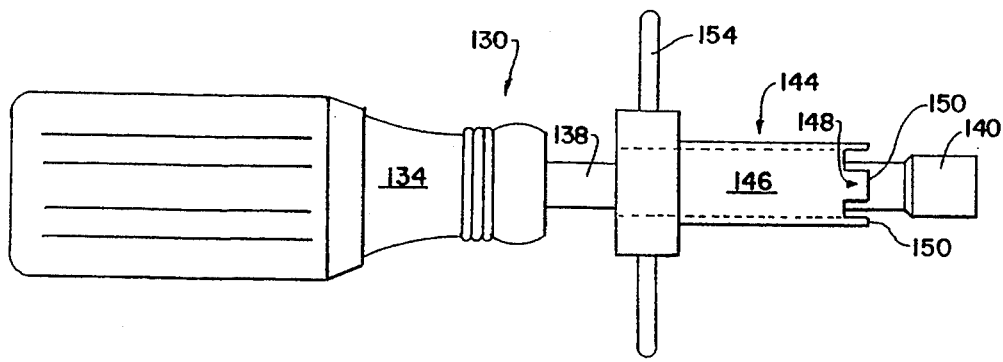
FIG. 3 is side view of a conventional core rod assembly adjusting hand tool which carries multiple wrenches.

Currently, the common method of making this adjustment is by employing tools such as illustrated in FIG. 3. A typical tool for this purpose is the multiple socket wrench 130, which comprises a handle 134 and a solid shaft 138. A hex shaped socket 140 is affixed at the outer end of the shaft 138 and is sized so as to be able to grasp a standard sized hex nut and rotate it. Another wrench 144 is slidably mounted on the shaft 138 and comprises a tubular body 146 having an inner diameter that permits a sliding fit with the outer diameter of the socket 140. One end of the body 146 is formed into a fingered socket or spanner 148 which is so dimensioned that it is able to be placed into the larger counterbore 72 of the core rod shown in FIG. 2. The individual fingers 150 of the spanner 148 can be positioned between the individual arms 86 to enable the wrench 144 to rotate the star nut 84. A handle 154 is formed at the other end of the body 146 of the wrench 144 to permit applying force to rotate the spanner 148.

The procedure that is currently followed when adjusting the stroke of the core rod assembly shown in FIG. 2 with the tool shown in FIG. 3 is to place the socket 140 around the hex nut 88, and then to slide the wrench 144 on the socket 140 so that the spanner 148 is placed with its fingers 150 within the spaces 92, 94, 96 and 98. The handle 154 is then manipulated so as to rotate the star nut 84 clockwise and move it to the left as viewed in FIG. 2. This will serve to release the locking force upon the hex nut 88. If it is then desired to decrease the stroke, the handle 134 is then rotated clockwise so as to advance the hex nut 88 to the left as viewed in FIG. 2, thus decreasing the dimension "s" and further compressing the spring 78. Following this, the handle 154 is manipulated so as to rotate the star nut 84 counter-clockwise and move it to the right as viewed in FIG. 2 into locking engagement with the hex nut. The commonly employed method of adjustment thus described using a tool such as 130 (FIG. 3) requires that both wrenches 140 and 144 rotate as well as translate longitudinally in order to effectuate an adjustment. The tool is then removed and a measurement is taken of the distance "s" in order to determine the stroke that has been set. In the event that the distance "s" is not set at the required or desired setting the entire process is repeated until the desired stroke setting is achieved.

Figure 4:
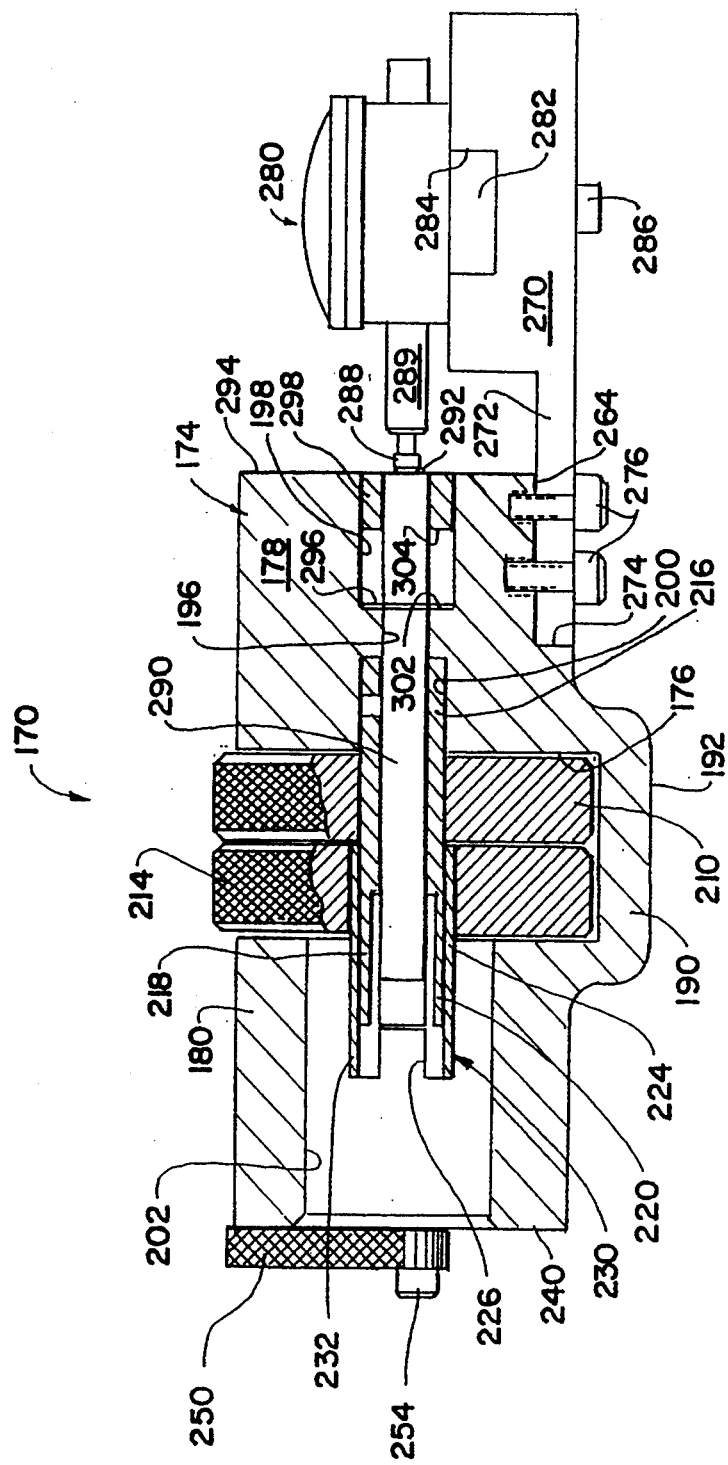
FIG. 4 is a side view, partially in cross-section, of a preferred embodiment of the core rod assembly adjusting tool of the present invention having a dial indicator measurement device mounted thereon.

The present invention provides a unitary tool for adjusting the stroke of the core rod valve while simultaneously providing a means for measuring the stoke that is set. A preferred embodiment of such a tool is shown in FIG. 4. The core rod assembly adjusting tool 170 comprises a housing 174 having a generally cylindrical configuration. A vertical opening 176 is formed centrally of the housing 174 which extends substantially the full depth of the housing, and completely through the cylindrical portion thereof to effectively bifurcate the housing into a rear portion 178 and a front portion 180. The lowermost part of the housing 174 is formed into a housing base 190, having a flat lower surface 192 (see FIGS. 5 and 7), which serves as a connecting bridge between the front and rear portions of the housing.

With reference again to FIG. 4 it is seen that a series of bores are provided longitudinally of the housing 174. The smallest diameter bore 196 is formed in the rear housing portion 178, which is in communication with the bore 198 leading to the rear of the housing. The bore 196 is also in communication at its other end with a bore 200 leading to the opening 176. The front housing portion 180 is provided with a through bore 202 centrally thereof which has a dimension capable of receiving a core rod.

A pair of thumbwheels 210 and 214 are located within the opening 176. The thumbwheel 210 is mounted with an interference fit to a shaft 216 which is freely rotatable within the bore 200. The shaft 216 has a recess 218 at its forward end shaped in the form of a hexagon to provide a deep-well socket wrench 220. The thumbwheel 214 is mounted with an interference fit to a shaft 224, the inner diameter of which is sized so that it can freely rotate on the outer diameter of the shaft 216. The forward end of the shaft 224 is formed with a series of slots 226 to provide a spanner wrench 230 having a series of arcuately shaped fingers 232.

Figure 5:
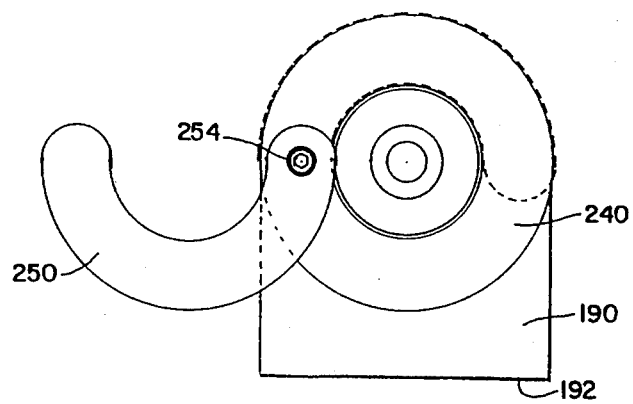
FIG. 5 is an end view of the preferred embodiment of the core rod assembly adjusting tool of the present invention shown in FIG. 4 with the core rod retainer shown in the opened position.

In order to mount the tool of the present invention on a typical core rod assembly, the front surface 240 of the housing 174 has an arcuately shaped retainer member 250 rotatably mounted thereon as by means of a shoulder screw 254, which is threadedly mounted into the front surface 240 (see FIG. 5). The retainer 250 is identical in all functional respects to the retainer 34 shown in FIG. 1 that holds the core rod 30 in the core rod holder 24, which is in turn mounted to the transfer head 20. The retainer 250 is normally in the position shown in solid lines in FIG. 5, but when assembled on the core rod 30 of an injection blow mold the retainer 250 is rotated into the position shown in dotted lines. This retainer member is intended to be engaged within an arcuate groove 260 (see FIG. 2) on the core rod 30.

Figure 7:
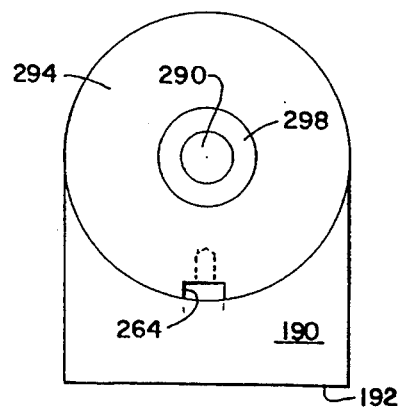
FIG. 7 is an end view of the preferred embodiment of the core rod assembly adjusting tool of the present invention of that end opposite to the end view shown in FIG. 5, with the valve stroke measuring device removed, but showing the arrangement for mounting a valve stroke measuring device.

In order to provide a measuring device as part of the core rod assembly adjusting tool, a mounting slot 264 is formed at the bottom of the rear portion 178 of the housing (see FIGS. 4 and 7). A housing extension member 270 has a tang 272 at its forward end which is so configured as to conform to the dimensions of the mounting slot 264. As shown in FIG. 4, the tang 272 is inserted into the slot 264 with its forward end abutted against the end wall 274 which defines the longitudinal extent of the slot. A series of screw fasteners 276 are employed to assure that the housing extension member 270 is securely fastened to the rear portion of the housing.

A measuring instrument, such as a dial indicator 280, is provided with a mounting boss 282 to permit assembly to the housing extension 270. The boss 282 fits within a recess 284 in the upper surface of the housing extension and is fastened therein by one or more screw fasteners 286. As is well known, the dial indicator includes a sensor needle 288 which slides within a tubular sleeve 289. The dial indicator is so mounted that the tubular sleeve 289 and the sensor needle 288 are aligned with the centerline of the tool 170.

A push rod or pin 290 is slidingly mounted in the bore 196. When the dial indicator is used as the measuring instrument, one end 292 of the rod is in contact with the sensor needle and normally rests flush with the end surface 294 of the rear housing portion 178. This rod is urged to the left as viewed in FIG. 4 by the sensor needle 288, which is spring loaded. A snap ring 296 is mounted on the rod 290 at a selected location so as to serve as a stop means for the push rod when it is subjected to the pressure of the spring loaded sensor needle 288. It is this action of the sensor needle which insures that the surfaces 292 and 294 are in the same plane when the sensor needle pushes against the end surface 292 of the rod. The forward portion of the rod 290 also slides within bore 196 and the hollow shaft 216. A bushing 298 provides an additional guide for the rear end of the rod 290. This bushing is press fit within the bore 198 and is flush with the surface 294. The snap ring 296 also acts as a stop to determine the rearward extent of translational movement of the rod 290. As indicated above, in the position shown in FIG. 4 the snap ring 296 rests against the end wall 302 formed in the rear housing 178 by the bore 198. When the rod 290 is moved to the right to its other extremity as viewed in FIG. 6, the snap ring 296 will come to rest against the inner end surface 304 of the bushing 298.

Figure 6:
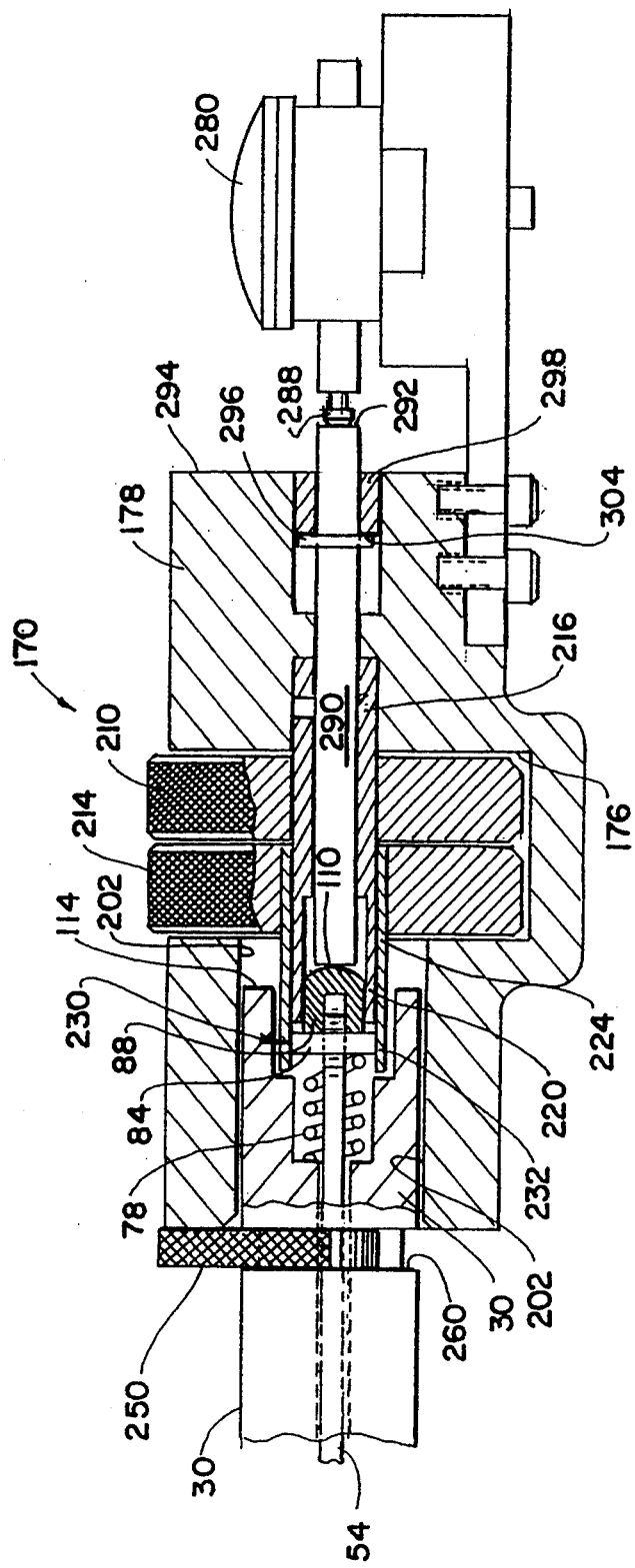
FIG. 6 is a side view, partially in cross-section, and similar to FIG. 4, of a preferred embodiment of the core rod assembly adjusting tool of the present invention mounted on the end of a core rod.

The use of the core rod assembly adjusting tool of the present invention is illustrated in FIG. 6. The tool 170 is mounted on a core rod, such as the core rod 30 of FIG. 2 with the end of the rod inserted into the bore 202. The retainer 250 is then rotated so that it enters into and rests within the arcuate groove 260 in order to lock the tool and the core rod together. In this position the fingers 232 of the spanner wrench 230 pass through the interstices of the star nut 84, the hex nut 88 is within the socket wrench 220, and the rear end surface 114 of the core rod is positioned just short of opening 176 so that rotation of thumbwheel 214 is not inhibited.

In order to adjust the stroke of the valve, the thumbwheel 214 is rotated clockwise as viewed from the right in FIG. 6 so that the star nut 84 can be advanced to the left along the threaded portion of valve stem 54. This will remove the locking force applied to the hex nut by the spring-loaded star nut, and allow the hex nut 88 to be rotated by the socket wrench 220 upon rotation of the thumbwheel 210, either clockwise or counterclockwise, depending upon whether the stroke is to be decreased or increased.

In the position shown in FIG. 6, the snap ring 296 rests against the surface 304 of the bushing 298 and the front end of the push rod 290 rests against the outermost portion 110 of the hex nut 88. In actuality, the range of adjustment of the stroke of a core rod valve will occur between the extremities of possible movement of the push rod 290 shown in FIGS. 4 and 6. However, for purposes of clarity of discussion it is assumed that the showing in FIG. 6 represents the largest valve stroke of the core rod that is permitted. In order to adjust the stroke to a smaller setting, once the star nut 84 is moved to the left and the locking force on hex nut 88 is removed, the thumbwheel 210 is rotated counterclockwise so that the socket wrench 220 is caused to rotate the hex nut 88 and advance it to the left along the valve stem 54, as viewed in FIG. 6. As this is done the spring loaded push rod 290 will move to the left and continue to remain in contact with the portion 110 of the hex nut 88 as well as the spring loaded dial indicator's sensor needle 288. A continuous reading is then available by means of the dial indicator 280 to indicate the amount of valve stroke that will be permitted as a result of the re-positioning of the hex nut 88 relative to core rod surface 114. When the desired setting is obtained, the thumbwheel 214 is rotated counterclockwise in order to cause the spanner wrench 230 to move the star nut to the right as viewed in FIG. 6. The star nut is moved until it is in locking engagement with the hex nut so that the desired setting is retained. The tool of the present invention thus allows for simultaneous adjustment and measurement of the position of the hex nut, and hence of the valve stroke, and further permits the tightening of the star nut into a locking position without removing and re-positioning either the tool or the stroke measurement device.

The adjustment of the valve stroke by use of the tool of the present invention thus permits the attainment of precision and repeatability of the adjustment process from cavity to cavity and cycle to cycle of the injection blow molding machine.

What has been described above is a preferred embodiment of a novel tool for adjusting and measuring the valve stroke of injection blow mold core rod assemblies. It is to be appreciated, of course, that various changes may be made in the configuration of the hollow centerless wrenches and the shafts on which they are mounted or form a part of, the materials of which they are made and the manner is which they are used, as well as the means by which the wrenches are rotated, all without departing from the spirit and scope of the present invention.

Thus, for example, while in the preferred embodiment of FIGS. 4 and 6 thumbwheels are used to rotate the shafts on which the wrenches are formed, a rack and gear or other arrangement may be employed for rotating the wrenches.

Also, although a dial indicator measuring instrument is illustrated in connection with the valve stroke adjustment mechanism other measuring devices can be employed which measure the movement of the push rod as a means of measuring the valve stroke.

Additionally, although what has been illustrated is the use of the tool of the invention to adjust and measure the valve stroke of a bottom opening valve, i.e. the valve is located at the extreme tip of the core rod, the tool may be used to set the valve stroke on a top opening valve, i.e. the valve is located midway on the core rod along the polished surface 310 (see FIG. 2) and close to the peripheral abutment 312 which determines the outermost extent to which the plastic material can flow in the mold, or the top of the article that is produced in the mold.

These and other changes are all considered to be within the spirit and scope of the present invention.

What is claimed is:

1. A unitary tool for adjusting and measuring the valve stroke of injection blow mold core rod assemblies which contain a valve and valve stem carrying a hex nut and a locking star nut, comprising, in combination:
    a housing having a series of passageways therein arranged on a common axis;
    a first portion of said passageways being sized to receive one end of a core rod assembly which has access to the hex nut and locking star nut therewithin;
    a pair of centerless hollow wrenches arranged within another portion of said passageways internally of said housing;
    one of said wrenches being configured to enclasp and rotate the hex nut of a core rod assembly;
    the other of said wrenches being configured to engage and rotate the locking star nut of a core rod assembly;
    means within said housing for selectively manipulating said wrenches; and
    means operatively associated with said housing for measuring the position of said hex nut along said valve stem.

2. A unitary tool according to claim 1 in which said means for manipulating said wrenches extend externally of said housing.

3. A unitary tool according to claim 1 wherein said means for manipulating said wrenches comprise a pair of thumbwheels, one of said thumbwheels being affixed to said hex nut wrench and the other of said thumbwheels being affixed to said star nut wrench.

4. The unitary tool of claim 3 wherein said thumbwheels project outside of said housing.

5. The unitary tool of claim 1 wherein a push rod is located within said passageways and extends into said hollow wrenches, and normally bears against the hex nut of a core rod assembly when said tool is mounted on a core rod assembly.

6. The unitary tool of claim 5 wherein said means for measuring the position of said hex nut comprises a dial indicator.

7. The unitary tool of claim 6 wherein said dial indicator includes a sensor element in alignment with said common axis which is arranged to bear against one end of said push rod, whereby when said hex nut is rotated so as to be re-positioned along said valve stem, said push rod is caused to translate within said housing and move said sensor element to provide a simultaneous reading of the position of said hex nut.

8. The unitary tool of claim 1 wherein said means for measuring the position of said hex nut comprises a dial indicator.

9. The unitary tool of claim 1 wherein said means for selectively manipulating said wrenches are so mounted within said housing as to be constrained against translation with respect to said housing, while being free to rotate with respect to the common axis.

10. The unitary tool of claim 9 wherein said one wrench is a deep-well socket, and wherein when said tool is assembled to a core rod assembly and said socket wrench is rotated, said hex nut is moved so as to translate within said deepwell socket while said tool remains stationary.

11. The unitary tool of claim 1 for use with a core rod assembly in which the locking star nut includes radially-arranged arcuately-spaced arms with interstices therebetween, and wherein the other of said wrenches is a spanner wrench having finger elements, whereby when said tool is assembled to such core rod assembly the finger elements of said spanner wrench will be placed into the interstices of said star nut, and upon manipulation of said spanner wrench to effect its rotation, said star nut will be rotated.

12. The unitary tool of claim 11 wherein said one wrench is a deep-well socket wrench, and wherein when said tool is assembled to a core rod assembly and said socket wrench is manipulated to effect its rotation, said hex nut is moved so as to translate within said socket while said tool remains stationary.

13. A unitary tool for adjusting and measuring the valve stroke of injection blow mold core rod assemblies which contain a valve and valve stem carrying a hex nut and a locking star nut, comprising, in combination:
   a housing having a series of passageways therein arranged on a common axis;
   a first portion of said passageways being sized to receive one end of a core rod assembly which has access to the hex nut and locking star nut therewithin;
   a pair of centerless hollow wrenches arranged within another portion of said passageways internally of said housing;
      one of said wrenches being configured to enclasp and rotate the hex nut of a core rod assembly;
      the other of said wrenches being configured to engage and rotate the locking star nut of a core rod assembly;
   a push rod located within said passageways and extending into said hollow wrenches, said push rod being arranged to normally bear against the hex nut of a core rod assembly when said tool is mounted on a core rod assembly;
   means within said housing and extending externally thereof for selectively manipulating said wrenches, said means being constrained against translation with respect to said housing, while being free to rotate with respect to the common axis; and
   means operatively associated with said housing and for measuring the position of said hex nut along said valve stem.

14. The unitary tool of claim 13 wherein said means for manipulating said wrenches comprise a pair of thumbwheels.

15. The unitary tool of claim 13 wherein said means for measuring the position of said hex nut comprises a dial indicator, and said dial indicator includes a sensor element in alignment with said common axis which is arranged to bear against one end of said push rod, whereby when said hex nut is rotated so as to be re-positioned along said valve stem, said push rod is caused to translate within said housing and move said sensor element to provide a simultaneous reading of the position of said hex nut.

16. The unitary tool of claim 13 wherein said one wrench is a deep-well socket, and wherein when said tool is assembled to a core rod assembly and said socket wrench is rotated, said hex nut is moved so as to translate within said deepwell socket while said tool remains stationary.

17. The unitary tool of claim 16 for use with a core rod assembly in which the locking star nut includes radially-arranged arcuately-spaced arms with interstices therebetween, and wherein the other of said wrenches is a spanner wrench having finger elements, whereby when said tool is assembled to such core rod assembly the finger elements of said spanner wrench will be placed into the interstices of said star nut, and upon manipulation of said spanner wrench to effect its rotation, said star nut will be rotated.

18. The unitary tool of claim 13 for use with a core rod assembly in which the locking star nut includes radially-arranged arcuately-spaced arms with interstices therebetween, and wherein the other of said wrenches is a spanner wrench having finger elements, whereby when said tool is assembled to such core rod assembly the finger elements of said spanner wrench will be placed into the interstices of said star nut, and upon manipulation of said spanner wrench to effect its rotation, said star nut will be rotated.

19. A method of adjusting and measuring the valve stroke of an injection blow mold core rod assembly, wherein a core rod contains a valve and valve stem which carries a hex nut and a locking star nut accessible from one end of said assembly, and wherein said star nut includes radially-arranged and arcuately-spaced arms with interstices therebetween; said method comprising the steps of:
   a) engaging the one end of said core rod assembly with a unitary tool, said tool comprising, in combination:
      a housing having a series of passageways therein arranged on a common axis;
      a first portion of said passageways being sized so as to receive that end of the core rod assembly which has access to the hex nut and locking star nut therewithin;
      a pair of centerless hollow wrenches arranged within another portion of said passageways internally of said housing;
         one of said wrenches being configured enclasp and rotate the hex nut of a core rod assembly;
         the other of said wrenches being configured engage and rotate the locking star nut of a core rod assembly;
      means within said housing for selectively manipulating said wrenches; and
      means operatively associated with said housing for measuring the position of said hex nut along said valve stem;
   b) actuating said wrench manipulating means so as to move said locking star nut to a position where it permits movement of said hex nut;
   c) thereafter actuating said wrench manipulating means so as to move said hex nut to thereby determine the stroke of the valve; said measuring means being simultaneously caused to provide continuous and current readings of the position of said hex nut relative to said tool housing;

d) repeating steps b) and c) until a desired positioning of said hex nut relative to said tool housing is obtained; and e) then actuating said wrench manipulating means so as to move said locking star nut to a position where it once again locks the hex nut against further movement along said valve stem.

20. The method of claim 19 wherein:

the unitary tool includes a push rod located within said passageways and extending into said hollow wrenches, said push rod normally bearing against the hex nut when the tool is engaged with said core rod assembly;

the means for measuring the position of said hex nut comprises a dial indicator which includes a sensor element;

the said one wrench is a deep-well socket, and wherein when said tool is assembled to a core rod assembly and said socket wrench is rotated, said hex nut is moved so as to translate within said socket while said tool remains stationary;

the other of said wrenches is a spanner wrench having finger elements, whereby when said tool is assembled to such core rod assembly the finger elements of said spanner wrench will be placed into the interstices of said star nut, and upon manipulation of said spanner wrench to effect its rotation, said star nut will be rotated;

and said method further including the step of placing said dial indicator with its sensor element in alignment with said push rod prior to actuating any one of said wrench manipulating means, whereby when said hex nut is rotated so as to be re-positioned along said valve stem, said push rod is caused to translate within said housing and move said sensor element to provide a simultaneous and continuous reading of the position of said hex nut along said valve stem.

21. A unitary tool for adjusting and measuring the valve stroke of injection blow mold core rod assemblies which contain a valve and valve stem carrying a cam nut and a locking nut, comprising, in combination:

a housing having a series of passageways therein arranged on a common axis;

a first portion of said passageways being sized to receive one end of a core rod assembly which has access to the cam and locking nuts therewithin;

a pair of centerless hollow wrenches arranged within another portion of said passageways internally of said housing;

one of said wrenches being configured to enclasp the said cam nut of a core rod assembly;

the other of said wrenches being configured to engage and rotate the said locking nut of a core rod assembly;

means within said housing for selectively manipulating said wrenches; and means operatively associated with said housing and in alignment with said common axis for measuring the position of said cam nut along said valve stem.

* * * * *